Dec. 19, 1939.　　　　R. A. SMITH　　　　2,183,976
SHOVEL
Filed Feb. 28, 1939　　　2 Sheets-Sheet 1
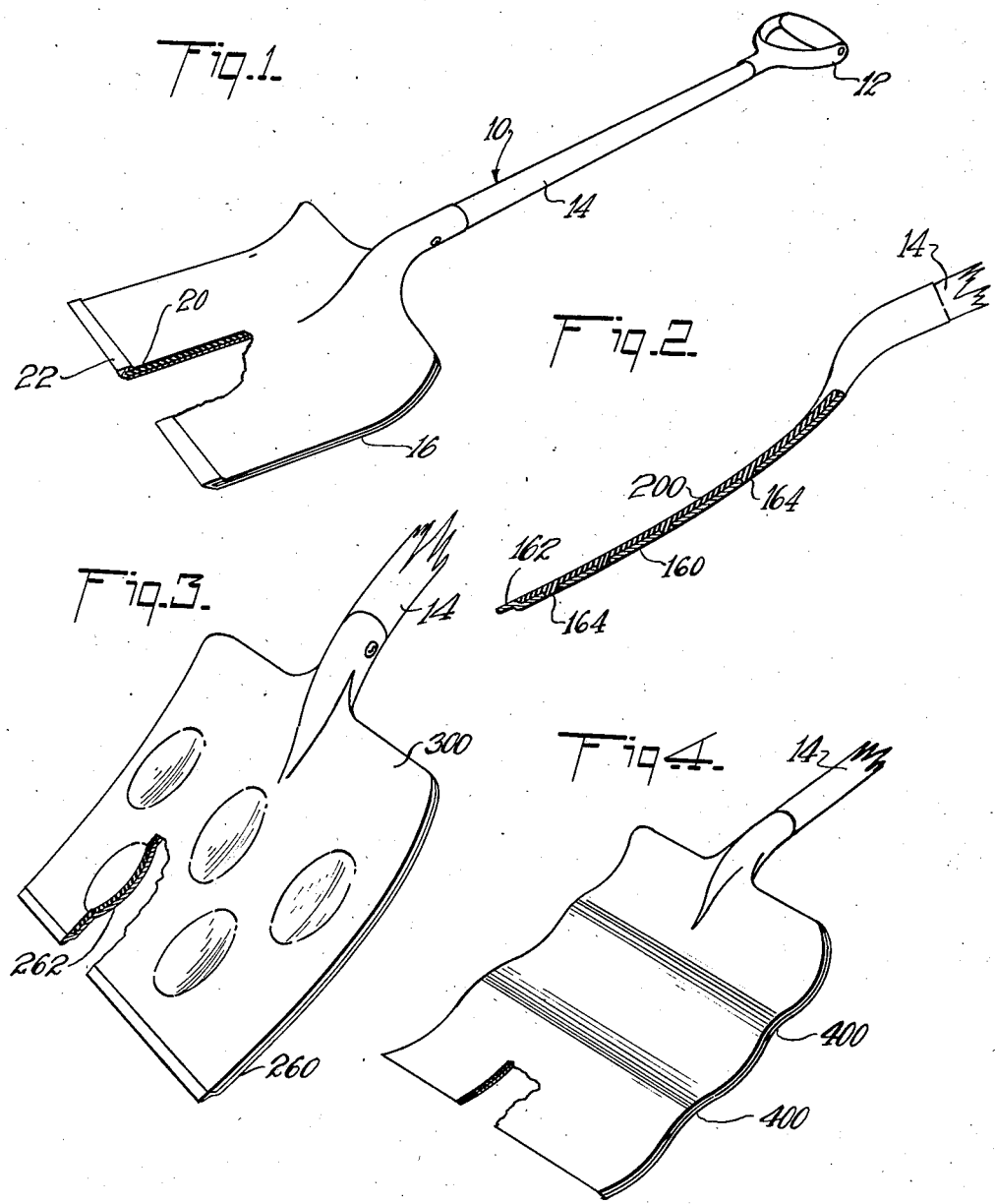
INVENTOR.
Robert A. Smith
BY Brown & Jones
ATTORNEYS Dec. 19, 1939.   R. A. SMITH   2,183,976
SHOVEL
Filed Feb. 28, 1939   2 Sheets-Sheet 2
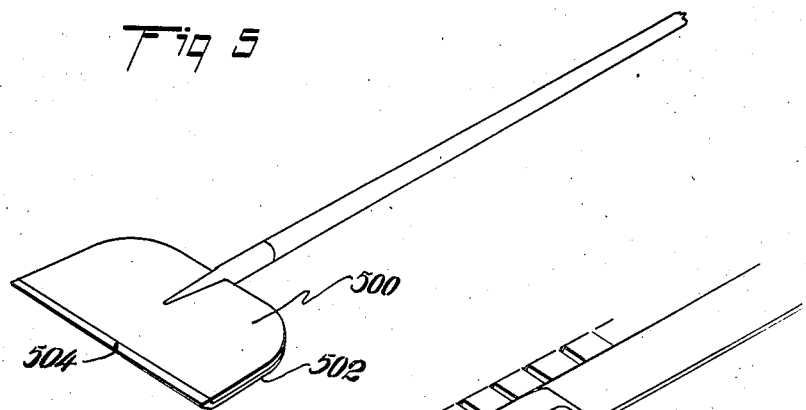
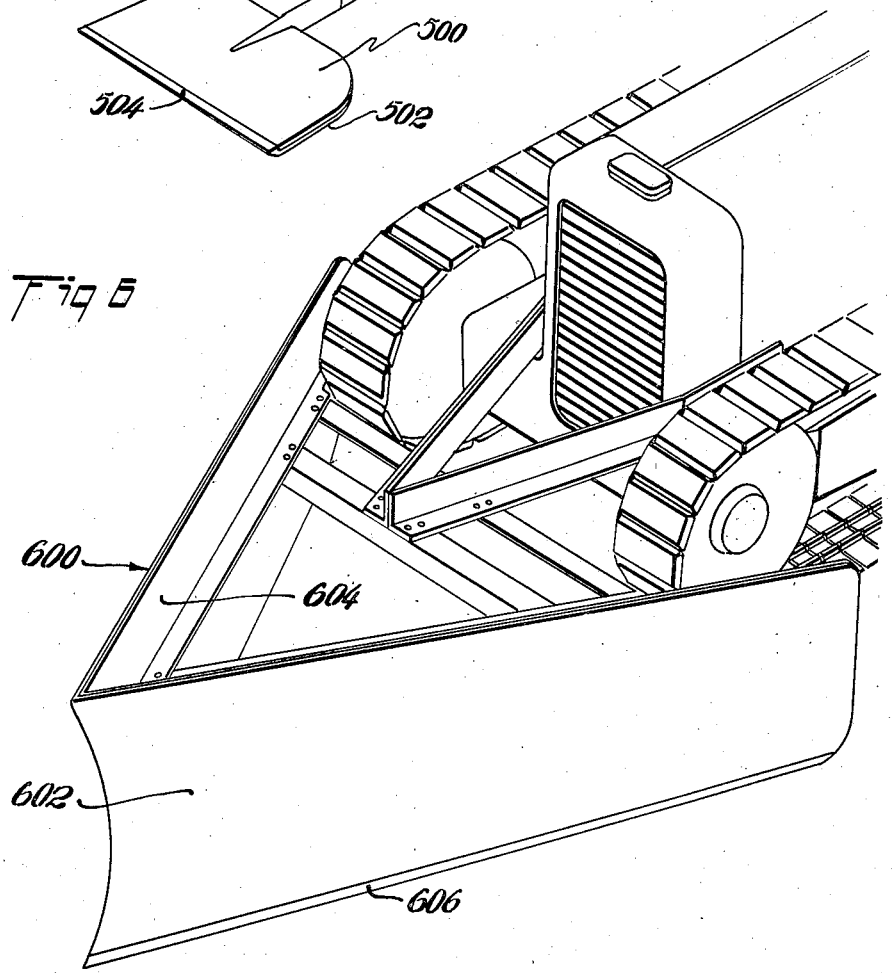
INVENTOR.
Robert A. Smith
BY Brown & Jones
ATTORNEY Patented Dec. 19, 1939

2,183,976

UNITED STATES PATENT OFFICE 2,183,976

SHOVEL

Robert A. Smith, Mahwah, N. J.

Application February 28, 1939, Serial No. 258,885

13 Claims. (Cl. 294—54)

This invention relates to a shovel, and more specifically to a hand shovel.

In general it is an object of the invention to provide a device of the character described which will efficiently perform the purposes for which it is intended, which is simple and economical of construction, which can be expeditiously, conveniently manipulated, and which can be readily manufactured and assembled.

Other objects of the invention are to provide a hand shovel which is particularly adapted for use in moving wet snow and to which wet, moist, or damp snow does not stick or cling to an undesirable extent; to provide such a device which is coated on at least one working surface with a material which adheres but slightly to wet snow; to provide such a device that an edge which may be used for scraping; and to provide such a shovel which is coated on an operative working face with rubber or the like.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawings, in which:

Figure 1 is a view partially in section and partially in perspective of one modification of the invention;

Fig. 2 is a cross-sectional view, in part, of a portion of a modified form of the device shown in Fig. 1;

Figs. 3 and 4 are views partially in perspective and partially in section of other modifications of the device shown in Fig. 1;

Fig. 5 is a perspective view of a further modification of the invention; and

Fig. 6 is a perspective view of a still further modification of the invention.

It is well known that it is difficult to shovel snow which is not dry. The wet snow does not slide from the shovel readily even when the latter is held in a vertical position of pounded against the ground. The snow continues to occupy the scoop of the shovel, thereby preventing the loading of more snow onto the shovel. The present invention contemplates a shovel which does not have that undesirable feature and from which snow slides easily even when moist.

In the drawings, 10 denotes generally a snow shovel having a handle 12 by which it is controlled by the hand of a user. The handle is connected by the usual shaft 14 to the scoop 16. The latter may be of any suitable form. It may be flat, concave, with or without raised sides or back edges, etc. The scoop may be of any usual shovel material, frequently a metal, such as steel. To the upper surface of the scoop there is applied a layer 20 of a material which shows slight adhesion to wet snow. It is preferable that this material be somewhat flexible. Such flexibility tends to prevent the separation of the material from the scoop when the latter for one reason or another becomes bent.

The material of layer 20 may be rubber and it may be applied and adhered to the scoop 16 in any of the known methods. If the scoop is of metal, it should be cleaned to receive the rubber, a suitable cement applied, and the rubber, if in sheet form, rolled on the scoop, or the cleaned metal shovel may, for example, be dipped into a rubber solution and the rubber caused to adhere to the shovel face. Successive dippings may be employed to build up a layer of rubber of the desired thickness. The rubber may, if desired, be sprayed onto the operative surface or surfaces of the shovel. The rubber may be cured after it is applied to the shovel.

Any desirable form of rubber compounds may be used. A coating of rubber from one sixty-fourth of an inch to a sixteenth of an inch has been found satisfactory.

Rubber-like substances may be used. Thus the synthetic rubbers are satisfactory, for example, that sold under the trade name "Neoprene." The latter, partially cured, may be cemented onto clean metal and the cure then completed. Certain of the resins may also be used, for example, the butyl acetal resin sold under the trade name "Butacite" can be applied and secured to clean metal under pressure and at a temperature of about 140° C. Likewise cellulose acetate has properties suitable to a certain extent for shovels of the type here described.

In some embodiments of the invention the forward or work-engaging edge of the layer 20 may be protected from rapid wear in the manner shown, for example, in Fig. 1, where the material forming the scoop 16 is formed backwardly as at 22 over the edge of the layer 20 and crimped or adhered thereon.

In Fig. 2 a further modification of the invention is shown. Here the material forming the layer 200 stops short of the work-engaging edge of the scoop 160 where the material forming the scoop has been bent into an offset, as shown at 162, so as to provide a working edge, for example an edge of metal, which extends beyond but which is coplanar with the exposed surface of the layer 200.

In one form of the invention also the material comprising the layer 200 may extend completely through orifices or slits in the material forming the scoop 160, thus providing extending lugs or rivet-like members 164 which may be integral with the material 200 and which may serve to affix it even more securely to the scoop 160.

Other modifications of the invention are shown in Figs. 3 and 4. In Fig. 3 the material forming the scoop 260 of the shovel is indented, as for example at 262, to provide depressions or pockets, and the material forming the layer 300 of low adhesion for sticky snow may penetrate into these depressions so as to insure a somewhat firmer bond between the material forming the layer and the material forming the scoop itself. Similarly, in Fig. 4 the scoop may be formed with irregularities, such as the corrugations 400, and the material forming the layer of low adhesion for sticky snow may conform to these corrugations. With such a form the shovel may be somewhat flexible and the corrugations may serve also to insure firm adhesion between the layer and the material forming the scoop.

The layer or coating applied to the scoop-forming base may, if desired, completely envelop the base.

While modifications of the invention shown in the first four figures of the drawings are shovels, it is to be understood that the invention is applicable equally to other snow-removal appliances, such as scrapers, plows, or the like, and the word "shovel" where used in the specification and claims is to be deemed generic to all such apparatus.

In Fig. 5 there is shown a scraper embodying the invention. Here 500 represents the coating having low adhesion for sticky snow, and 502 represents the metal backing therefor which may be adapted, as shown at 504, to provide a working edge.

Fig. 6 shows somewhat diagrammatically the application of the present invention to a snow plow shown generally as at 600. The face of the plow is preferably covered with a material of the type described, 602, having low adhesion for sticky snow, and this material may be coated to a suitable metal backing 604, which may provide also an uncoated lower edge 606 for contact with the ground or roadway.

So also it is to be understood that while in one form of the invention the work-engaging edge is so designed that the layer is protected from wear by a protruding lip or fold of the material forming the base of the shovel, such a structure is not essential, and if desired the edges of the scoop 16 and the coating thereon 20 may be in registry, as shown in Fig. 4, no protection being furnished to the work-engaging edge of the coating. Under such circumstances it may be desirable to provide transverse rivet or lug elements such as those shown at 164 in Fig. 2 closely adjacent the forward or work-engaging edge of the shovel.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A shovel comprising a scoop and an outer substantially durable layer of non-metallic material from the class consisting of rubber and the synthetic plastics, affixed to the work-engaging face of said scoop, said material having low adhesion for moist snow.

2. A shovel comprising a metal scoop and an outer substantially durable layer of flexible non-metallic material affixed to the work-engaging face of said scoop, said material having low adhesion for moist snow.

3. A shovel comprising a metallic scoop and an outer substantially durable layer of non-metallic material affixed to an operative face of said scoop, said material having less adhesion for moist snow than does said scoop.

4. A shovel comprising a metallic scoop and a layer of a material from the group consisting of the synthetic plastics and rubber affixed to an operative face of said scoop, said material having low adhesion for moist snow.

5. A shovel comprising a metal scoop and a layer of rubber bonded to a work-engaging face thereof.

6. A shovel comprising a metal scoop and a layer of rubber on the upper face of the scoop, the metal portion of said scoop extending beyond the rubber layer at the work-engaging edge of said scoop.

7. A shovel comprising a metal scoop and an outer layer of rubber on the upper face of said scoop, the work-engaging edge of said scoop overlying the adjacent edge of said layer of rubber.

8. A shovel comprising a scoop encased in rubber approximately to the work-engaging edge thereof.

9. A shovel comprising a scoop having an outer layer of a butyl acetal resin on the upper face of said scoop.

10. A shovel comprising a scoop and an outer layer of synthetic rubber bonded to the upper face of said scoop.

11. A shovel comprising means providing a working face comprising a durable layer of a non-metallic material from the class consisting of the synthetic plastics and rubber bonded to a metallic backing, said layer having low adhesion for sticky snow.

12. A shovel comprising a metallic backing element, a working face thereof being coated with a thin durable layer of a non-metallic material having low adhesion for sticky snow, said coating being permanently affixed to said backing, the work-engaging edge of said backing extending beyond said coating.

13. A shovel comprising a metallic backing element, a working face thereof being coated with a thin durable layer of a non-metallic material having low adhesion for sticky snow, said coating being permanently affixed to said backing.

ROBERT A. SMITH.